United States Patent [19]

Ishii et al.

[11] Patent Number: 5,964,813
[45] Date of Patent: Oct. 12, 1999

[54] VEHICLE DIAGNOSTIC DATA STORING SYSTEM

[75] Inventors: Shigeru Ishii; Yoshihide Shinso; Mitsuru Fujioka, all of Kanagawa, Japan

[73] Assignee: Nissan Motor Co., Ltd., Yokohama, Japan

[21] Appl. No.: 08/961,091

[22] Filed: Oct. 30, 1997

[30] Foreign Application Priority Data

Nov. 7, 1996 [JP] Japan ................................ 8-294914

[51] Int. Cl.⁶ ............................ G06F 7/00; G06F 19/00
[52] U.S. Cl. ........................ 701/35; 701/29; 701/34; 701/36; 701/63
[58] Field of Search ............................ 701/29, 30, 31, 701/34, 35, 102, 114, 115, 36, 63; 340/438, 459; 307/10.1; 364/131, 133, 134

[56] References Cited

U.S. PATENT DOCUMENTS

| | | | |
|---|---|---|---|
| 4,271,402 | 6/1981 | Kastura et al. .......................... 701/35 |
| 5,388,045 | 2/1995 | Kamiya et al. .......................... 701/35 |
| 5,420,792 | 5/1995 | Butsuen et al. .......................... 701/96 |
| 5,479,347 | 12/1995 | Oguro et al. .......................... 701/33 |
| 5,696,676 | 12/1997 | Takaba .......................... 701/34 |

FOREIGN PATENT DOCUMENTS 59-145945 8/1984 Japan .
61-169332 7/1986 Japan .

*Primary Examiner*—William A. Cuchlinski, Jr.
*Assistant Examiner*—Gertrude Arthur
*Attorney, Agent, or Firm*—Foley & Lardner

[57] ABSTRACT

A vehicle diagnostic information storage system includes a volatile storage device such as a backup RAM and a nonvolatile storage device such as EEPROM. If a fault occurs, a control section stores data on fault items, and input and output conditions of sensors of a vehicle control system, in the volatile storage device and updates the data in the volatile storage device during a vehicle operation. In response to a switching operation of a vehicle main switch such as a turn-on operation of an ignition switch, the control section transfers the most recent version of updated data from the volatile storage device to the nonvolatile storage device.

15 Claims, 4 Drawing Sheets

VEHICLE DIAGNOSTIC DATA STORING SYSTEM

The contents of a Japanese Patent Application No. P8-294914 with a filing date of 7 Nov. 1996 in Japanese are hereby incorporated by reference.

BACKGROUND OF THE INVENTION

The present invention relates to a diagnostic system for a vehicle, and more specifically to a system for storing diagnostic information.

Complicated vehicle control systems increase the need for onboard diagnostics (self diagnosis) for diagnosing faults and malfunctions in the systems.

Japanese Patent Provisional Publication No. 61-169332 shows a conventional diagnostic system for an automatic transmission.

In some conventional examples, diagnostic information is lost when the driver turns off the ignition switch. The diagnostic system of the above-mentioned Japanese document employs a nonvolatile memory for saving information on detected faults. However, this system is not arranged to use the nonvolatile memory effectively in consideration of the characteristics of the memory.

SUMMARY OF THE INVENTION

It is an object of the present invention to provide diagnostic information storage system and process capable of making effective and optimum use of memories and facilitating diagnostic analysis.

According to the present invention, a fault information storage system for storing fault information on a vehicle control system, comprises first storing means of a battery backup type for storing fault information if a fault occurs, and updating the fault information during a vehicle operation; and second storing means of a nonvolatile type for storing a most recent version of the fault information of the first storing means.

This system allows an updating operation of the fault information in the first storing means during a vehicle operation (from an ignition switch on operation to an ignition switch off operation, for example), and writes the final version of the fault information into the second storing means if the fault information is updated during the vehicle operation.

DETAILED DESCRIPTION OF THE INVENTION

Figure 1:
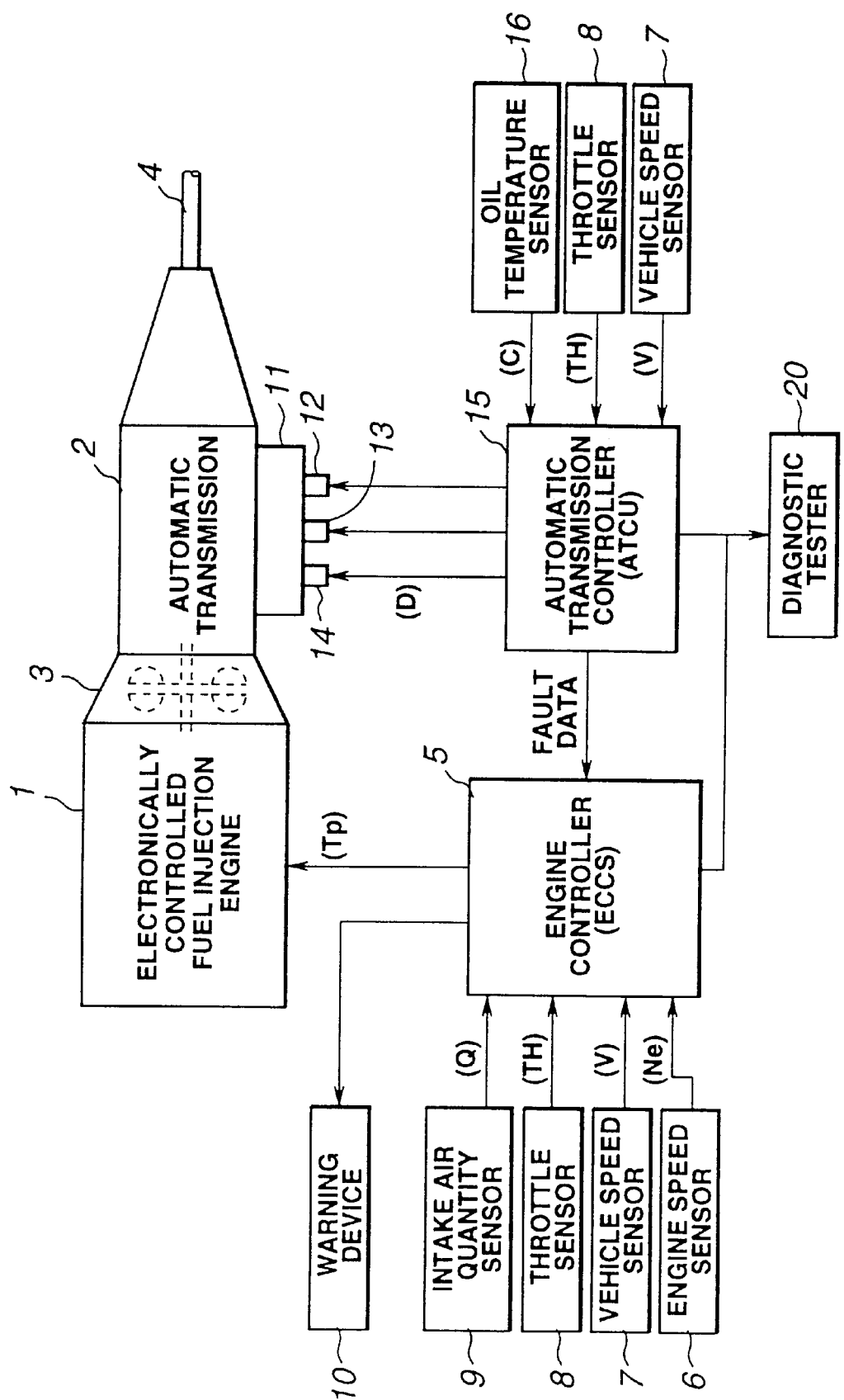
FIG. 1 is a schematic view showing a vehicle control and diagnosis system according to one embodiment of the present invention.

FIG. 1 shows a vehicle control system including a fault information storing system according to one embodiment of the present invention. The present invention is applicable to a vehicle equipped with one or more control systems. The vehicle control system shown in the example of FIG. 1 is an integrated control system combining an engine control system and an automatic transmission control system in a manner enabling information communication therebetween.

In this example, the power train of the vehicle includes at least an electronically controlled fuel injection type engine 1, an electronically controlled automatic transmission 2, a torque converter 3 and a transmission output shaft 4. This integrated control system is in the form of a vehicle power train control system in which the engine 1 and automatic transmission 2 (including associated sensors) are controlled systems (or plants).

An engine controller or engine control unit (ECCS) 5 controls the engine 1. In addition to the engine controller 5, the engine controlling system further comprises a group of various sensors for sensing engine and/or vehicle operating conditions. In the example of FIG. 1, the sensor group comprises an engine speed sensor (or engine revolution sensor) 6, a vehicle speed sensor 7, a throttle position sensor 8, and an intake air quantity sensor (or intake air flow sensor) 9. In the example shown in FIG. 1, a warning device 10 in the form of a warning lamp is connected with the engine controller 5.

The automatic transmission 2 has a control valve system 11 including shift solenoids 12 and 13 and a lockup solenoid 14. An automatic transmission controller or control unit (ATCU) 15 controls the automatic transmission 2. The controlling system for the automatic transmission 2 further comprises various sensors such as the vehicle speed sensor 7, the throttle sensor 8 and an oil temperature sensor 16.

A diagnostic tester 20 is an external tester which can be connected to the control system.

The engine controller (ECCS) 5 receives signals from the engine speed sensor 6 for sensing an engine speed Ne (rpm), the vehicle speed sensor 7 for sensing a vehicle speed V, the throttle position sensor 8 for sensing a throttle opening degree TH, the intake air quantity sensor 9 for sensing an intake air quantity Q. In this way, the engine controller 5 collects input information from the associated sensor group including at least these sensors.

The engine controller (ECCS) 5 comprises an input section (or input detecting section), a processing section, a memory section and an output section. The processing section performs various control programs such as fuel injection control program, ignition timing control program, diagnosis control program and warning indication control program. The memory section stores these control programs, results of computation and various other data items. The output section delivers various control signals such as a fuel injection control signal to control the engine.

Specifically, the engine controller 5 determines a fuel injection pulse width Tp in accordance with the input information representing engine and vehicle operating conditions, and controls the fuel injection quantity supplied to the engine 1 by sending the fuel injection control signal to the engine 1. The engine controller 5 further controls the ignition timing of the engine 1 by sending the ignition timing control signal to the engine 1.

Furthermore, the engine controller 5 performs the diagnostic control program and warning indication control program stored in the memory section. By so doing, the engine controller 5 performs diagnostic checks to detect faults or abnormal conditions, and turns on a warning light of the warning device 10 in case of a fault.

The automatic transmission 2 receives driving power from the engine 1 through the torque converter 3, and delivers the power from the output shaft 4 at a gear ratio corresponding to a selected speed. The speed of the automatic transmission 2 is determined by a combination of the on and off states of the shift solenoids 12 and 13 in the control valve 11. By a duty control (or duty factor control) of the lockup solenoid 14 in the control valve 11, the torque converter 3 is put in the converter state for a hydrodynamic drive or in the lockup state providing a direct mechanical drive.

The AT controller 15 controls the ON/OFF states of the shift solenoids 12 and 13, and the drive duty factor D of the lockup solenoid 14. The AT controller 15 receives the signals from the vehicle speed sensor 7, the throttle sensor 8, and the oil temperature sensor 16 for sensing the temperature C of the transmission oil. Thus, the AT controller 15 collects input information from the sensor group including these sensors at least. The vehicle speed sensor 7 and throttle sensor 8 may be provided in each of the engine control system and the automatic transmission control system independently, or may be provided for only one of the control systems with the aid of means for communicating data between both systems.

The AT controller (ATCU) 15 comprises an input (detecting) section, a processing section, a memory section and an output section. The ATCU processing section performs a shift control program, a lockup control program, a control program for treating fault information of the diagnosis, and other control programs. The memory section stores these programs, results of computation and various other data. The output section delivers control signals for driving the shift solenoids 12 and 13 and the lockup solenoid 14. In accordance with the input information, the AT controller 15 controls the speed ratio of the transmission 2 and the state of the torque converter 3 by performing the shift control program and lockup control program.

Figure 2:
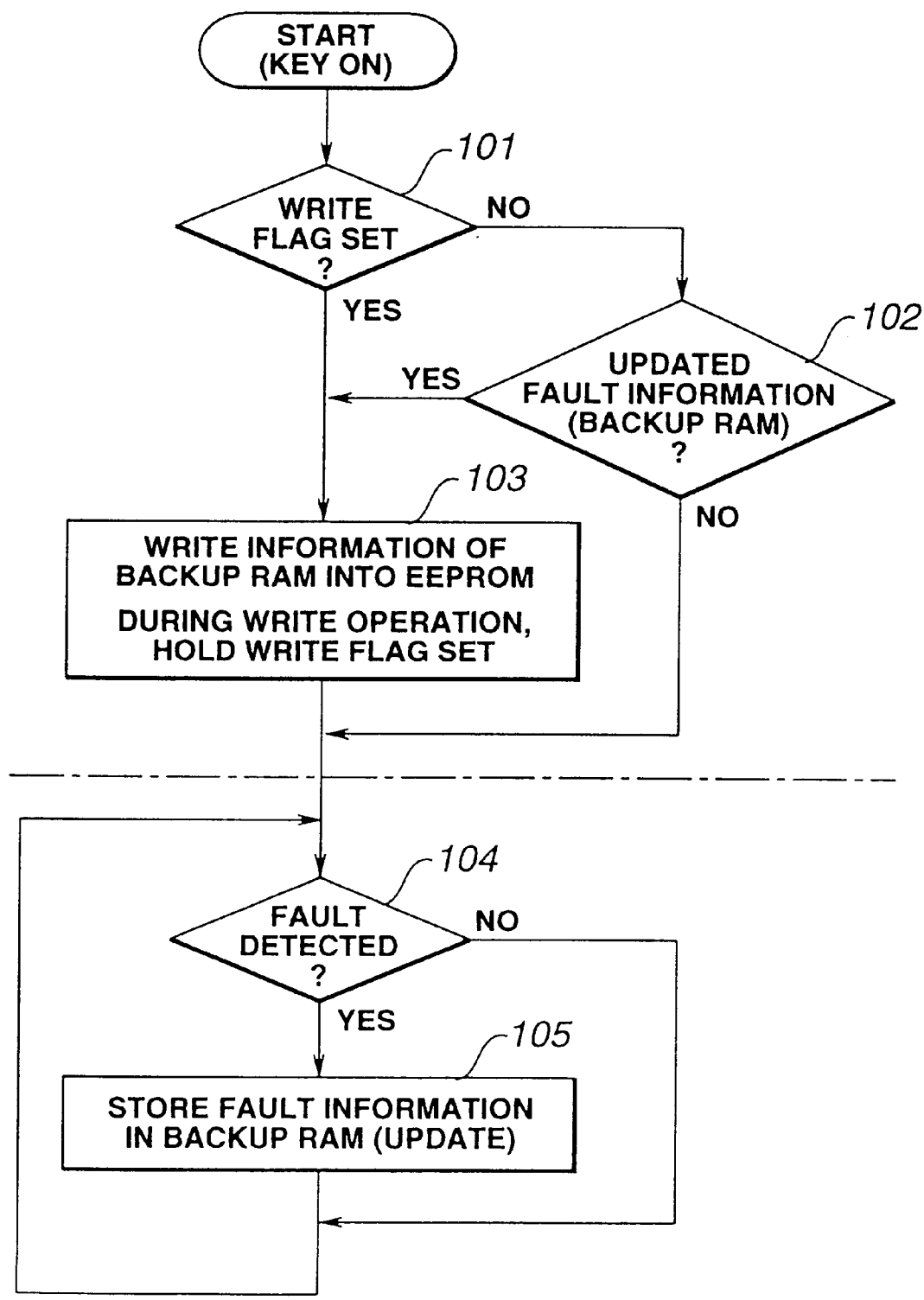
FIG. 2 is a flowchart showing a control process for writing information on fault according to the embodiment of FIG. 1.
Figure 3:
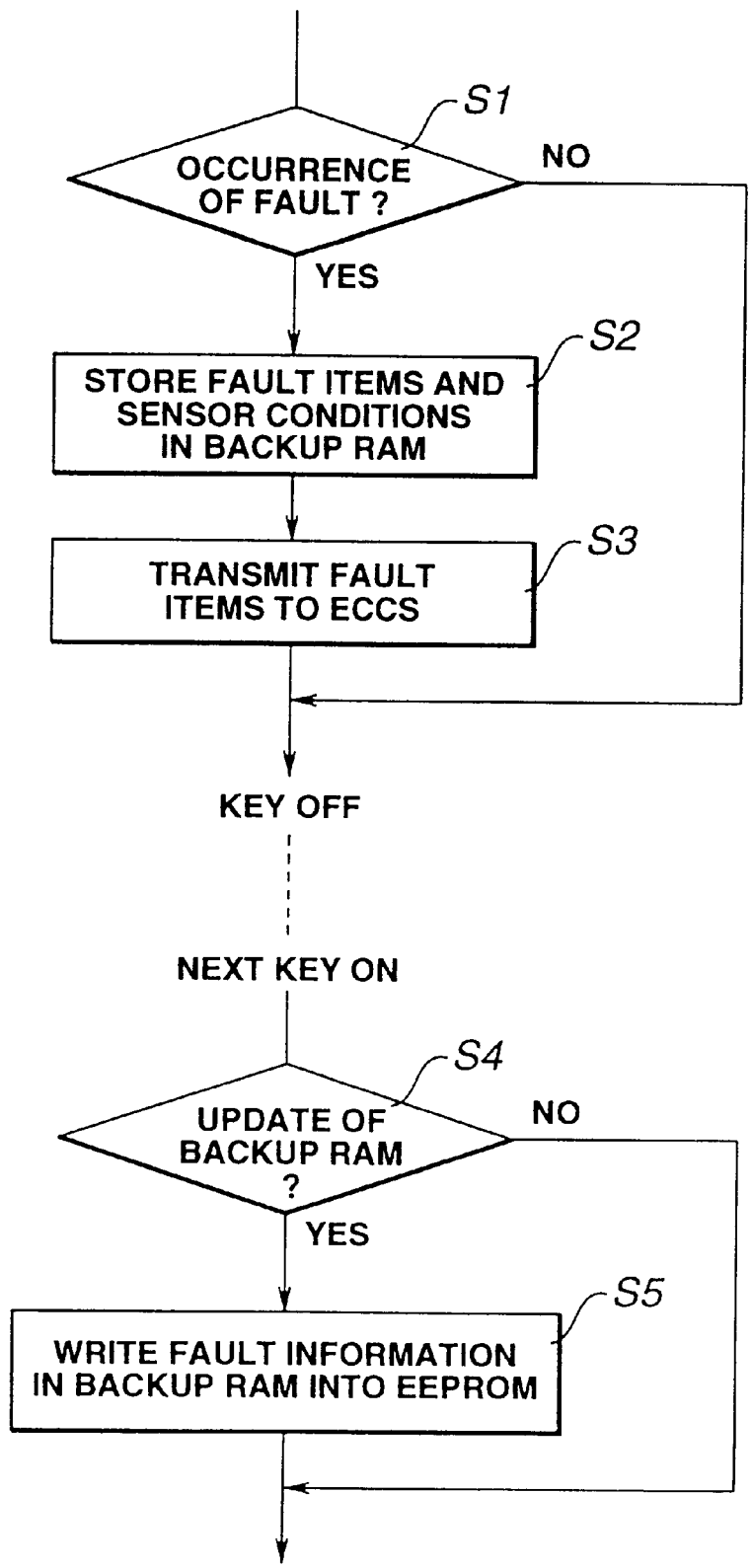
FIG. 3 is a flowchart illustrating a basic writing operation for fault information.

Furthermore, the AT controller 15 of this example performs fault information storing and updating operations to a backup RAM and storing operation to a nonvolatile memory such as EEPROM by performing a control program shown in FIGS. 2 and 3.

In this example, the warning device 10 is connected with the engine controller 5, and arranged to collectively indicate warnings about faults concerning the engine 1 and the automatic transmission 2. Accordingly, the engine controller 5 and the AT controller 15 are connected together, and diagnostic information is supplied from the AT controller 15 to the engine controller 5.

The backup RAM serves as a first memory backed up by a battery, and the EEPROM serves as a second memory requiring no backup. In this example, the backup RAM and EEPROM are included in the memory section of the AT controller 15.

In this example, the transmission of diagnostic information to the engine controller 5 is included in a process shown in FIG. 3. This process (steps S1~S5) is designed to store, if a fault occurs, fault items, input and output conditions of each sensor at the time of occurrence of the fault and other information items in the backup RAM, and to write the information of the backup RAM into the EEPROM at a next ignition key on operation. The process of FIG. 3 includes a fault checking operation for checking if a fault exists (S1), a storing operation for storing fault data items and input and output conditions of the sensors in the backup RAM (S2), an update checking operation for checking an update of the backup RAM (S4), and a writing operation for writing the updated fault information into the EEPROM (S5). In this example, the operation (S2) for storing the information into the backup RAM is followed by an operation (S3) for transmitting information to the engine controller 5.

The steps S1 and S2 are carried out in the following manner.

In the fault checking step S1, the AT controller 15 carries out the diagnostic control program repeatedly at regular intervals of a predetermined cycle time, from an ignition key on operation to a next ignition key off operation. In this program, the AT controller 15 collects information required for diagnostic judgement for a plurality of test items by reading the vehicle speed V, the throttle opening TH, the transmission oil temperature and other input information items from the sensors 7, 8 and 16 and the other sensors, and determines if an abnormal condition does exist or not for each of the test items. For example, the control system makes a diagnosis according to the following logic. The vehicle speed sensor is judged to be abnormal if the output of the vehicle speed sensor does not increase from zero at all during movement of the vehicle though the engine speed Ne sensed by the engine speed sensor is high.

On the occurrence of a fault, the AT controller 15 stores at least one fault diagnostic item in the backup RAM at the step S2. The AT controller 15 of this example further stores, in the RAM, information on the input and output conditions of each sensor at the time of occurrence of a fault. Then, the transmitting operation of the step S3 is performed.

The step S3 following the step S2 is for information communication between the AT controller 15 and the engine controller 5. Preferably, the AT controller 15 converts diagnostic judgement information into contiguous or continuous diagnostic judgement information (AT diagnostic judgement information) of a predetermine format about the automatic transmission 2, and then transmits the converted information. In one example of the data format, data of a predetermined time length is equally divided into divisions, and each division is used to retain information on a predetermined test item. For example, a header is stored in a first section; many information items follow sequentially about each item of inhibitor switch abnormality, vehicle speed sensor abnormality, 1st speed abnormality, . . . , line pressure solenoid abnormality, throttle abnormality, engine revolution abnormality, oil temperature sensor abnormality sequentially; and a parity is attended to the last.

On the other hand, the engine controller 5 too performs a fault detecting diagnostic control program repeatedly at regular intervals of a predetermined time length during a vehicle operation from an ignition key on operation to a next ignition key off operation. In this program, the engine controller 5 collects information required for diagnostic judgement for a plurality of test items by reading the engine speed Ne, the vehicle speed V, the throttle opening TH, the intake air quantity Q and other input information items from the sensors 6, 7, 8 and 9 and the other sensors, and determines if an abnormal condition does exist or not for each of the test items, according to a similar logic. Information on diagnostic judgement (engine diagnostic judgement information) is stored in the ECCS memory section.

During this, the engine controller 5 receives the AT diagnostic judgement information periodically at regular intervals of a predetermined time length from the AT controller 15, and stores the received information in the memory section of the engine controller 5. The memory section of the engine controller 5 contains both of the engine diagnostic judgement information and the AT diagnostic judgement information, and the engine controller 5 controls the engine diagnostic judgement information and the AT diagnostic judgement information collectively. Furthermore, the engine controller 5 performs the warning indication control for the warning device 10. In accordance with the collected information, the engine controller 5 locates a fault in the automatic transmission control system inclusive of the sensors, and a fault in the engine control system inclusive of the sensors, and actuates the warning device 10 to display a warning indicative of the location of the detected fault with one or more warning lights.

In this example, the engine controller 5 stores and manages the AT diagnosis information together with the engine diagnosis information, and informs the driver of abnormal conditions in connection with the engine and transmission in a concentrated and united manner with the warning device 10 to help the driver to diagnose in real time.

A satisfactory diagnostics for detecting a fault and examining the location and cause of a fault can not be attained if diagnostic information is lost in the event of power removal by an ignition key off operation as in an on-board diagnostics in which diagnostic information is only sent to the engine control unit without storing in a backup RAM. By contrast to this, the on-board diagnostic system according to this embodiment is configured to store data on fault items and conditions of the sensor group in the backup RAM when a fault occurs, enable the updating of the data in the backup RAM, and transfer the updated data into the EEPROM, in addition to the data transmitting operation to the engine controller 5. The EEPROM requiring no backup can retain the stored information even if the control unit is removed. Furthermore, the amount of fault information can be readily increased by adding information on input and output sensor conditions. This system facilitates the analysis of the location and cause of a fault.

The steps S4 and S5 are designed to use the EEPROM in an effective manner.

Memories of the nonvolatile type are advantageous in the capability of retaining data without the need for a backup power supply. The nonvolatile memory enables the analysis of past faults even if the ignition switch is turned off or an onboard control unit is removed from the vehicle. However, the nonvolatile memory has also its disadvantages.

For example, EEPROM has the following limitations. A guaranteed number of writing operations is about 10000. The write time required to write 1 byte data is about ten msec. These limitations are taken into consideration in the system of this embodiment.

To prevent an unwanted increase in the number of repetitions of the writing operation to the EEPROM, the system carries out the writing operation only if predetermined conditions are met. The system is arranged to check if the information is updated or not. If it is, this system write, into the EEPROM, the finally updated version of information obtained in a vehicle operation (from an ignition switch on operation to an ignition switch off operation). In this way, this system can use the EEPROM in an effective and optimum manner.

The diagnostic system of this embodiment is arranged to write diagnostic information into the EEPROM when the ignition switch is turned on to start a vehicle operation. In a reset process at the time of an ignition switch off operation, it is difficult to obtain sufficient time for writing diagnostic information amounting to tens of bytes. Therefore, the diagnostic system of this embodiment is arranged to write information into the EEPROM when the ignition switch is turned on. The information updated in a previous vehicle operation is written into the EEPROM at the time of a next ignition switch on operation.

If the ignition switch is turned off during a writing operation to the EEPROM, the system of this embodiment performs the same writing operation again to save the information. In the illustrated example, the diagnostic system employs a write flag indicating the state that the write operation into the EEPROM is in progress. The system holds the write flag in a set state during a write operation and clears the write flag when the write operation is completed. If the ignition switch is turned off during a write operation, the write flag is held in the set state, and the writing operation is performed again at the time of a next ignition on operation if the write flag remains set.

FIG. 2 shows a writing process according to this embodiment. The above-mentioned operations are incorporated in the process of FIG. 2. The process of FIG. 2 comprises a writing section of steps 101~103, and an updating section of steps 104 and 105. The writing process section is for writing information into the nonvolatile memory which is the EEPROM in this example. The updating process section is a loop for entering new diagnostic information into the volatile memory which is the backup RAM in this example. The AT controller 5 performs the writing section only once immediately after each ignition key on operation whereas the loop of the updating section is repeated during a vehicle operating time from an ignition key on operation to a next ignition key off operation.

At the step 101, the AT controller 15 checks if the write flag is set or not, immediately after a current ignition key on operation. The write flag is a condition code stored in the backup RAM for indicating that a writing operation to the EEPROM is in progress. The write flag is set during the writing operation to the EEPROM (cf. the step 103), and cleared at the end of the writing operation.

If the writing operation of information from the backup RAM to the EEPROM is normally completed at the last write timing (at the last key on operation), and hence the write flag is cleared, then the AT controller 15 proceeds from the step 101 to the step 102.

At the step 102, the AT controller 15 checks the contents in the backup RAM and determines if there is new fault information updated (at the step 105) in the last vehicle operation from the previous key on operation to the previous key off operation. In this example, the backup RAM retains only one set of fault information, that is, the most recent information.

When the answer of the step 102 is negative because of the nonexistence of fault information updated in the last vehicle operation, the AT controller 15 proceeds to the step 104 of the updating section skipping the step 103 to avoid wasteful use of the EEPROM. In this example, the AT controller 15 follows the course of the steps 101 and 102 only one time immediately after the ignition key on operation, and directly enters the loop of the steps 104 and 105.

The step 104 is a decision step for determining whether a fault occurs, and the step 105 is for updating the fault information in the backup RAM by storing current fault information. This system stores fault information in real time. When the answer of the step 104 is negative because of the absence of a fault, the AT controller 15 constantly monitors the system by repeating the step 104. When the answer of the step 104 is affirmative because of the occurrence of a fault, the AT controller 15 saves the fault items and input and output conditions of each sensor in the backup RAM.

In this way, the AT controller 15 repeats the fault checking step 104 during the current vehicle operating time from the current ignition key on operation to the current ignition key off operation, and updates the fault information each time a fault is detected, so that the most recent fault information is retained in the backup RAM at the time of the current ignition key off operation.

If the step 105 is reached in the previous vehicle operation, and hence the answer of the step 102 is affirmative, the AT controller 15 ascertains the existence of updated fault information in the backup RAM and proceeds from the step 102 to the step 103. At the step 103, the AT controller 15 takes the fault information updated in the previous vehicle operation from the backup RAM, and writes the fault information into the EEPROM. If the step 103 is reached, the AT controller 15 transfers the most recent information from the backup RAM to the EEPROM only once immediately after the ignition key on operation.

In this example, the EEPROM can contain 10~20 sets of fault information. Preferably, new information is added into the EEPROM sequentially without deleting old information. That is, the EEPROM includes a plurality (10~20) of sets of memory locations. For example, each location set includes a memory location used for the vehicle speed sensor 7, another for the throttle sensor 8, and so on. The system first stores information into the first memory location set, and then into the second memory location set without erasing the contents of the first location set. When the last memory location set is used, then the AT controller stores new information into the first location set by deleting the old information in the first location set. This storage system retains the old fault data as long as the memory capacity of the EEPROM allows. Therefore, this storage system enables examination of the history of past abnormal conditions and facilitates analysis of the location and cause of a fault.

The write flag is held set during the writing operation of the step 103. When the writing operation ends, the AT controller 15 resets the write flag and then proceeds to the loop of the steps 104 and 105.

If the driver turns off the ignition key switch during the writing operation to the EEPROM, the write flag remains in the set state, and causes the AT controller 15 in the next execution of the step 101 to proceed from the step 101 to the step 103. Therefore, the AT controller 15 performs the writing operation of the step 103 again, without regard to the judgement of the step 102, after the next ignition key on operation.

The thus-constructed fault information storage system according to this embodiment can make effective use of the backup RAM and EEPROM. Even if the AT control unit (ATCU) 5 is removed from the vehicle, its EEPROM can retain the stored fault information.

Figure 4:
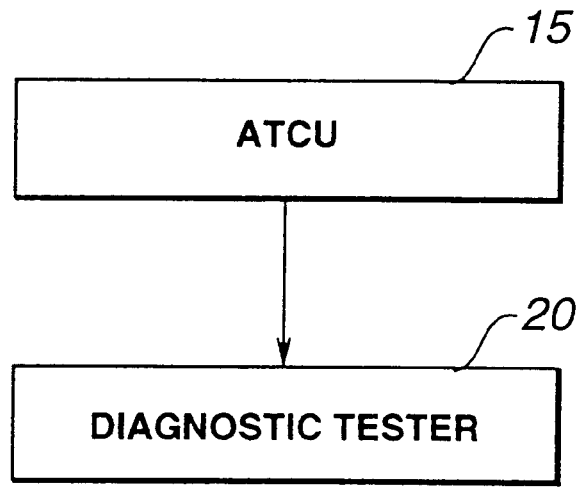
FIG. 4 is a block diagram showing a diagnostic tester which can be used in the system of FIG. 1.

FIG. 4 shows the diagnostic tester 20 connected with the AT controller 15.

When the diagnostic tester 20 is connected with the AT controller 15 and a mode of displaying fault information is selected, the AT controller 15 supplies a collection of data in the EEPROM to the tester 20, and the tester 20 displays the received data. The collection of data in the EEPROM comprises the most recent version of diagnostic information updated in the last vehicle operation and transferred from the backup RAM, and one or more old versions of diagnostic information. The diagnostic tester 20 is an external device which can be connected with and disconnected from the AT controller 15. The diagnostic tester 20 makes it possible to use the diagnostic information in the EEPROM from the outside.

Instead of EEPROM, it is possible to employ various other nonvolatile memories such as flash memory.

The fault information storage system of the present invention is applicable to the diagnostic system disclosed in Japanese Patent Provisional Publication No. 59-145945 and to the diagnostic system disclosed in the before-mentioned Japanese Patent Provisional Publication No. 61-169332. The present invention is applicable to any one or more of various vehicle control systems. The vehicle control system need not be an integrated control system. The present invention is applicable to only one of the engine control system and the transmission control system. The transmission may be a planetary gear transmission or may be a continuously variable transmission.

Figure 5:
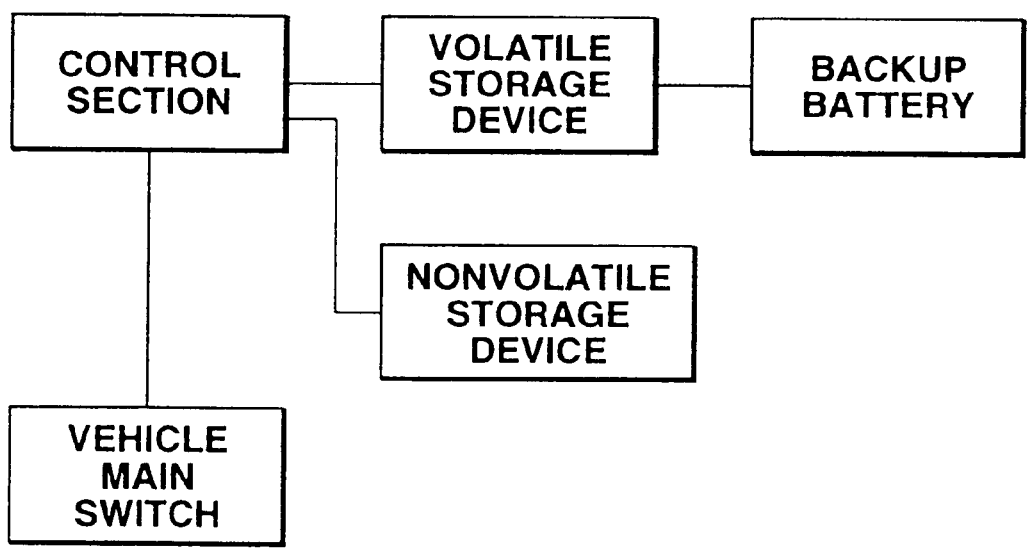
FIG. 5 is a block diagram showing, as an example, an arrangement of main components according to the present invention.

FIG. 5 shows, as an example, an arrangement of basic components of the present invention. The system of FIG. 5 comprises a memory section and a control section. The memory section includes at least a volatile storage device backed up by a backup battery, and a non-volatile storage device such as EEPROM. The control section comprises one or more controllers such as the AT controller 15 or the combination of the AT controller 15 and the engine controller 5. The control section is connected with a vehicle main switch such as an ignition switch of a motor vehicle.

What is claimed is:

1. A fault information storage system for storing fault information on a vehicle control system, comprising:

a first storing unit of a battery backup type for storing fault information if a fault occurs, and updating the fault information during a vehicle operation;

a second storing unit of a nonvolatile type for storing a most recent version of the fault information in the first storing unit;

a control unit for detecting a fault in the vehicle control system, for updating the fault information each time a fault is detected during the vehicle operation from a turn-on of an ignition key switch of the vehicle to a turn-off of the ignition key switch, and for performing a writing operation of writing the most recent version into the second storing unit if the fault information is updated during the vehicle operation, the control unit including a writing unit for performing the writing operation to write the information updated in a previous vehicle operation when the ignition switch is turned on, wherein the writing unit performs the writing operation again if the ignition switch is turned off during the writing operation.

2. A fault information storage system as claimed in claim 1 wherein said control unit includes a setting unit for setting a write flag to a first condition during the writing operation, resetting the write flag to a second condition at an end of the writing operation, holding the write flag in the first state if the ignition switch is turned off during the writing operation, and performing the writing operation again if the write flag is in the first state at the time of a next turn-on operation of the ignition switch.

3. A fault information storage system as claimed in claim 1 wherein said vehicle control system comprises an automatic transmission control system, and the fault information comprises data on fault items and data representing input and output conditions of sensors of the vehicle control system.

4. A diagnostic control system, comprising:

a memory section for storing diagnostic information, said memory section comprising a volatile storage device and a nonvolatile storage device; and a control section for storing the diagnostic information in the volatile storage device, updating the diagnostic information in the volatile storage device with a mere recent version during a vehicle operation and transferring a most recent version of the diagnostic information from the volatile storage device into the nonvolatile storage device, wherein the volatile storage device is connected with a backup battery, and the control section is connected with a vehicle main switch and configured to transfer the most recent version of the diagnostic information from the volatile storage device to the nonvolatile storage device in response to a switching operation of the vehicle main switch.

5. A diagnostic control system as claimed in claim 4 wherein the control section is configured to transfer the most recent version of the diagnostic information from the volatile storage device to the nonvolatile storage device in response to a turn-on operation of the vehicle main switch.

6. A storage control system as claimed in claim 5 wherein the control section is configured to rewrite the most recent version into the non-volatile storage device if the vehicle main switch is turned off during a writing operation for transferring the most recent version into the non-volatile storage device.

7. A diagnostic control system as claimed in claim 6 wherein the control section is configured to set a write flag to a first state during a memory write operation, to set the write flag to a second state at an end of the memory write operation, to hold the write flag in the first state if the vehicle main switch is turned off during the memory write operation to the nonvolatile storage device, and performs the memory write operation again if the write flag is in the first state.

8. A diagnostic control system as claimed in claim 5 wherein the volatile storage device stores a current set of diagnostic information items, and replaces the current set with a next set of diagnostic information items when the next set is entered; and wherein the non-volatile storage device stores a plurality of sets of diagnostic information items.

9. A diagnostic control system as claimed in claim 5 wherein the control section comprises a first control unit for controlling a first controlled system of the vehicle, and a second control unit for controlling a second controlled system of the vehicle, storing the diagnostic information on the second controlled system in the volatile storage device, updating the diagnostic information of the volatile storage device with a more recent version during a vehicle operation, transferring a most recent version of the diagnostic information from the volatile storage device into the nonvolatile storage device, and transmitting the diagnostic information from the memory section to the first control unit which is connected with an indicating device.

10. A diagnostic control process for a vehicle, comprising:

an updating step of storing diagnostic information in a volatile storage device and updating the diagnostic information during a vehicle operation; and a writing step of transferring the diagnostic information from the volatile storage device to a nonvolatile storage device, wherein the updating step comprises a fault detecting sub-step for detecting a fault in a vehicle control system, and an updating sub-step for updating the diagnostic information in the volatile storage device if a fault is detected; and the writing step comprises an update checking sub-step for producing a first condition signal if the diagnostic information in the volatile storage device is updated, and a writing sub-step for transferring an updated version of the diagnostic information if the first condition signal is present.

11. A diagnostic control process as claimed in claim 10 wherein the updating step is repeated during each vehicle operation from a turn-on operation of a vehicle main switch to a turn-off operation of the vehicle main switch whereas the writing step is performed only once in each vehicle operation.

12. A diagnostic control process as claimed in claim 11 wherein the writing step is performed when the vehicle main switch is turned on.

13. A diagnostic control process as claimed in claim 12 wherein the writing step further comprises an interruption checking sub-step for producing a second condition signal if the vehicle main switch is turned off during a writing operation of the writing step, and wherein the writing sub-step is performed if at least one of the first and second condition signals is present, and the writing sub-step is skipped if both of the first and second condition signals are absent.

14. A diagnostic control process as claimed in claim 13 wherein the diagnostic control process further comprises a data transmitting step for transmitting the diagnostic information from the volatile storage device to a third storage device.

15. A diagnostic control process as claimed in claim 14 wherein the data transmitting step is performed after the updating sub-step.

* * * * *